P. J. WEBER, Jr.
VEHICLE ARRESTER.
APPLICATION FILED OCT. 8, 1914.
1,141,291.
Patented June 1, 1915.
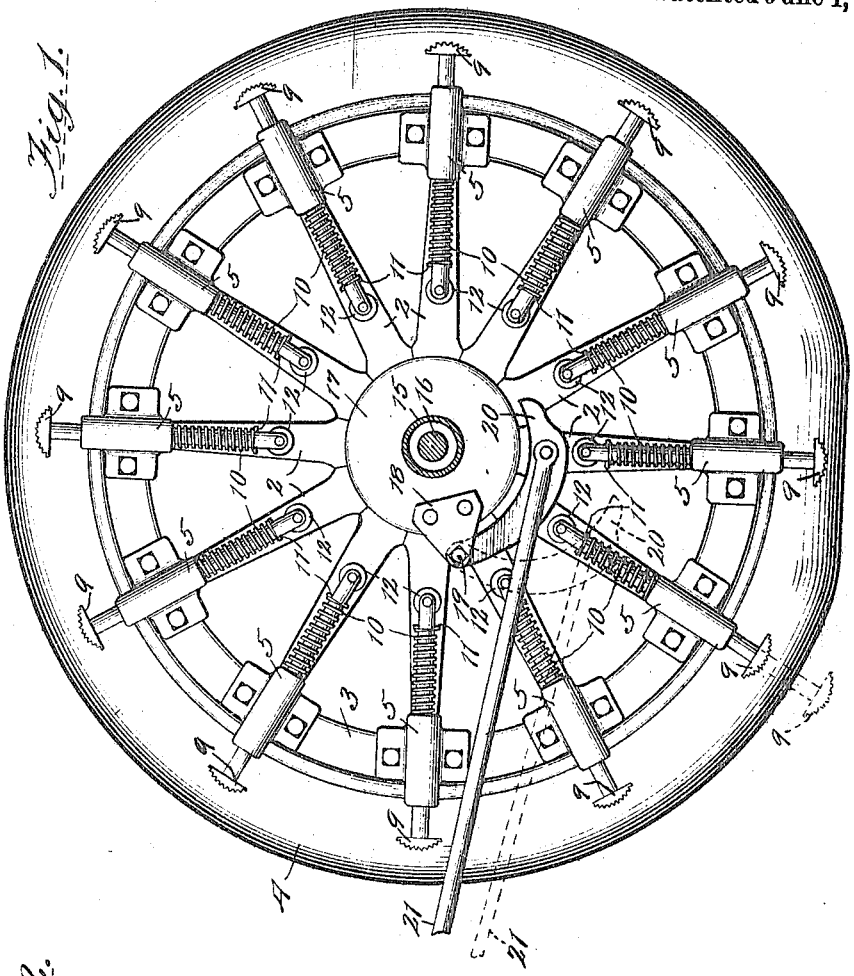
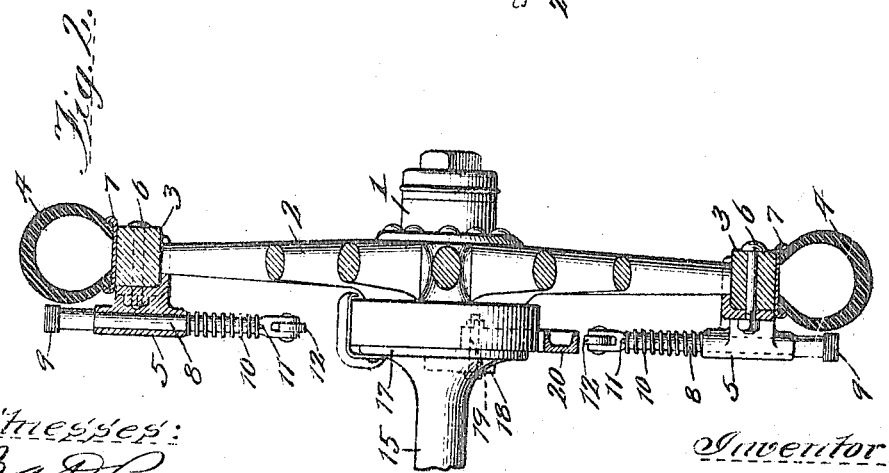
Witnesses:
Inventor:
Philip J. Weber Jr.
By Cheever & Cox

UNITED STATES PATENT OFFICE.

PHILIP J. WEBER, JR., OF CHICAGO, ILLINOIS.

VEHICLE-ARRESTER.

1,141,291.  Specification of Letters Patent.  Patented June 1, 1915.

Application filed October 8, 1914. Serial No. 865,638.

*To all whom it may concern:*

Be it known that I, PHILIP J. WEBER, Jr., a citizen of the United States, residing at Chicago, in the county of Cook and State of Illinois, have invented a certain new and useful Improvement in Vehicle-Arresters, of which the following is a specification.

My invention relates to vehicle arresters and the object of the invention is to provide means whereby the driver without leaving his seat may, in case of emergency, after he has applied his ordinary brakes, throw out one or more projections from the wheel which will engage the surface of the roadway and thus bring the vehicle to an immediate stop.

Another object is to so construct the mechanism that by throwing it to intermediate position, without the brakes on, the projections may occupy such position as to increase the tractive effort of the wheel.

I accomplish my objects by the mechanism illustrated in the accompanying drawing in which—

Figure 1 is an elevation showing the inner side of a vehicle wheel equipped with my arrester. Fig. 2 is an elevation partly in section showing the parts illustrated in Fig. 1.

Similar numerals refer to similar parts throughout the several views.

In the form selected to illustrate the invention the wheel itself consists of a hub 1, having spokes 2, connected to a felly 3, the felly being encircled by a tire 4.

While my invention is intended primarily for motor vehicles, especially passenger cars, it will be understood that the invention is applicable to other vehicles and that the design of the wheel itself may be greatly varied without departing from the spirit of the invention.

According to my invention I provide a series of guides 5 and fasten them by bolts 6 or otherwise to the felly of the wheel or to the rim 7 thereof. In each of these guides is a rod 8, preferably provided at its outer end with a shoe 9. By preference the number of rods is equal to the number of spokes and the parts are so mounted that a rod will lie adjacent to and parallel with each spoke on the inner side of the wheel. This renders the rods practically invisible from the outside of the wheel. Encircling each rod is a coiled spring 10 for normally holding the rod retracted. One end of the spring abuts the inner end of the guide and the other end of the spring engages a pin 11 or some other part of the rod as best shown in Fig. 2. It is desirable to provide an antifriction roller 12 at the inner end of each rod. Under normal conditions the rods are held by the springs 10 well out of reach of the pavement.

The means for projecting the arrester rods will now be described.

A stationary sleeve 15 surrounds the axle 16 and terminates in a disk 17 which is provided with a lug or bracket 18. Pivoted to said bracket by a pin 19 or otherwise is a projector cam 20. This cam is articularly connected to a pull rod 21 which is manipulated by any suitable mechanism in the control of the driver. The outer edge of the cam, which is the working edge, is so formed and the parts are so constructed that when the cam occupies the normal position shown in Fig. 1 said working edge will lie out of reach of the antifriction rollers 12, but when the rod 21 is pulled forward (to the left Fig. 1) the cam will be swung down into the path of said rollers and cause the associated rods and shoes to be projected. The arrangement is such that when the cam is thus brought to maximum acting position the shoe which is next in advance of the point of contact of the tire with the pavement will be projected to the maximum thus serving to block the wheel. The cam is so configurated that when brought to an intermediate position the shoe temporarily at the lowest portion of the wheel and the one next ahead thereof will be projected slightly beyond the perimeter of the tire, thus enabling the driver to increase the tractive effort of the wheel in going through sandy or muddy roads, or on slippery pavements.

In operation, under normal conditions the pull rod 21 will be released and the parts will assume the position shown in full lines Fig. 1. If the operator wishes to increase the tractive effort of the wheel he advances the pull rod to some intermediate position, the position depending upon the distance to which he wishes to project the shoes beyond the perimeter of the tire. If the operator desires to come to a sudden stop and he finds that his ordinary brake is not enough or that his wheels are skidding, he first applies his regular brakes and locks the wheel. He then advances his rod 21 to maximum position as the result of which the rear tip or tail of the cam passes forward of the rod temporarily vertical and leaves it in normal position, but projects to a maximum the rod next in front, thus obtaining the effect indicated in dotted lines in Fig. 1. This places in front of the wheel an obstacle which will dig into the pavement and at the same time present a formidable barrier to the progress of the vehicle even though the brakes permit the wheel to rotate. If the wheel does rotate or should ride over the projected shoe the next shoe ahead will immediately and automatically be presented for action. It will thus be seen that under normal conditions the wheel operates just as the ordinary wheel does, and the cam will have no effect upon the arrester rods. But by manipulating the pull rod 21 the operator may increase the tractive effort of his wheel or he may project one of the arrester rods far enough toward the pavement in advance of the wheel to effectually block the advance of the vehicle.

Having thus described my invention, what I claim as new and desire to secure by Letters Patent, is:—

1. In a vehicle, the combination with the running gear and axle, of a wheel mounted on said axle, a series of radially movable rods mounted on said wheel, means for normally holding said rods in retracted position, and a rod-operating cam movable in a vertical plane, said cam when in one position having that portion of its working edge which is farthest from the center of the axle in front of a vertical plane passing through the center of the axle.

2. In a vehicle, the combination with the running gear and axle, of a wheel mounted on said axle, a series of radially movable rods mounted on said wheel, means for normally holding said rods in retracted position, and a rod-operating cam movable in a vertical plane, said cam when in one position being non-active upon said rods and in another position having the point of maximum eccentricity in front of a vertical plane passing through the axis of the wheel.

3. In a vehicle, the combination with the running gear and axle, of a wheel mounted on said axle, a series of radially movable rods mounted on said wheel, and a rod-operating cam movable in a vertical plane, said cam when in one position acting upon the rod most nearly vertical to bring said rod into action, and said cam when in another position being out of engagement with the rod most nearly vertical and being in engagement with the rod in front of the rod most nearly vertical.

4. In a vehicle, the combination with the running gear and axle, of a wheel mounted on said axle, a series of radially movable rods mounted on said wheel, means for normally holding said rods in retracted position, a rod-operating cam pivotally attached at one end to said running gear and adapted to oscillate in a plane parallel to the plane of the wheel, the cam pivot being eccentric to the wheel and in advance of the axis thereof, and means for holding said cam in two different positions relative to its pivot, said cam in one position being non-active upon the rods and in another position having the point of maximum eccentricity of its working edge in advance of the wheel axis.

5. In a vehicle, the combination with the running gear and axle, of a wheel mounted on said axle, a series of radially movable rods mounted on said wheel, yielding means for normally holding said rods retracted, a cam for operating said rods pivotally attached at one end to said running gear at a point considerably in front of the axle, said cam being adapted to oscillate in a plane parallel to the plane of the wheel, and means for controlling said cam, the cam being capable of being swung downward to a position where the free end thereof will clear the rod temporarily vertical and at the same time project the rod in advance thereof.

6. In combination, a vehicle wheel, a series of radially movable rods mounted on said wheel, a stationary support, a cam pivotally mounted on said support and swingable in a plane parallel to the plane of the wheel, the cam pivot being eccentric to the wheel, and a rod for operating said cam, said cam when in normal position being out of engagement with the rod, and when in intermediate position acting upon a plurality of said rods, and when in maximum advanced position having its working edge out of engagement with the most nearly vertical rod and in engagement with the rod next ahead thereof.

In witness whereof, I have hereunto subscribed my name in the presence of two witnesses.

PHILIP J. WEBER, Jr.

Witnesses:
 HOWARD M. COX,
 ETTA L. WHITE.